US011430235B2

(12) United States Patent
Yamanaka

(10) Patent No.: US 11,430,235 B2
(45) Date of Patent: Aug. 30, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Satoru Yamanaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/011,317

(22) Filed: Sep. 3, 2020

(65) Prior Publication Data

US 2021/0073565 A1 Mar. 11, 2021

(30) Foreign Application Priority Data

Sep. 6, 2019 (JP) ............................ JP2019-162566

(51) Int. Cl.
*G06K 9/00* (2022.01)
*G06V 30/146* (2022.01)
*G06V 10/25* (2022.01)
*G06V 10/24* (2022.01)
*G06V 30/10* (2022.01)

(52) U.S. Cl.
CPC ........ *G06V 30/1478* (2022.01); *G06V 10/245* (2022.01); *G06V 10/25* (2022.01); *G06V 30/10* (2022.01)

(58) Field of Classification Search
CPC .. G06K 9/3283; G06K 9/3216; G06K 9/3233; G06K 2209/01
See application file for complete search history.

(56) References Cited

U.S. PATENT DOCUMENTS 5,613,016 A * 3/1997 Saitoh .................. G06V 30/414
382/176
9,367,899 B1 * 6/2016 Fang ......................... G06T 7/11
10,521,697 B2 * 12/2019 Agarwal .............. G06K 9/6235
2005/0236484 A1 * 10/2005 Taylor .............. G06K 19/06037
235/462.04
2006/0221402 A1 * 10/2006 Jiang ...................... G06Q 10/10
358/3.22
2008/0273807 A1 * 11/2008 Dauw .................... H04N 19/21
382/237

(Continued)

FOREIGN PATENT DOCUMENTS

CA 2791624 A1 * 9/2011 ........... A61B 5/0059
EP 1051025 A1 * 11/2000 ............ G06T 5/009

(Continued)

*Primary Examiner* — Oneal R Mistry
(74) *Attorney, Agent, or Firm* — Rossi, Kimms & McDowell LLP

(57) ABSTRACT

An image processing apparatus executes a first morphology for a first binary image, to generate a second binary image, specifies a vertical line missing region based on the second binary image, executes a second morphology under a condition different from a condition in the first morphology for the second binary image, to generate a third binary image, acquires pixel information about a region corresponding to the vertical line missing region in the third binary image, and corrects a region corresponding to the vertical line missing region in the first binary image using the acquired pixel information, to generate a fourth binary image.

13 Claims, 14 Drawing Sheets

(56) References Cited

U.S. PATENT DOCUMENTS

2011/0026813 A1 * 2/2011 Meyer ...................... G06K 9/38
382/162

FOREIGN PATENT DOCUMENTS

EP 1282073 A2 * 2/2003 ........... G06T 1/0064
JP H01266682 A 10/1989
JP 2010114567 A 5/2010

* cited by examiner

```
         マイショップ
          川崎店
      TEL 0120-123-4567
  2019年04月11日(木)  No.0003

  カンコーヒー          ¥120
  カップラーメン        ¥220
  タワシ              ¥210
  サランラップ          ¥350
  タマゴ              ¥160
  ──────────────────────────
  小計             ¥1,060
    (内消費税         ¥85)
  合計             ¥1,145
    お預かり         ¥1,145
    お釣              ¥0
```

500

501 502 503 504 505 506 507 508 509

IMAGE PROCESSING APPARATUS, IMAGE PROCESSING METHOD, AND STORAGE MEDIUM

BACKGROUND

Field

The present disclosure relates to an image processing apparatus that corrects an image, an image processing method, and a storage medium storing a program for performing the image processing method.

Description of the Related Art

An image processing technique for extracting information such as a date, a company name, an amount of money, and a telephone number (hereinafter referred to as "document information") from a scan image obtained by scanning a document such as a business form or a receipt has been generally known. An example of a method of extracting the document information is a method described below. According to the method, the document is first scanned to acquire a scan image, and characters in the scan image are recognized by OCR (optical character recognition). Further, respective types of items such as a date, a company name, and an amount of money and respective positions of characters corresponding to the items are estimated from information such as a character string, a positional relationship, a character type, and a format of the recognized characters, to extract document information.

By the above-described image processing technique, the document information corresponding to the items such as a date, a company name, and an amount of money in a document such as a business form or a receipt can be automatically acquired. Accordingly, productivity of office work such as accounting can be improved.

To extract the document information with higher accuracy from the scan image of the document such as a business form or a receipt, it is important to enhance a character recognition accuracy by the OCR. Generally, to enhance the character recognition accuracy, a method of subjecting the scan image to image processing (binarization, noise removal, etc.) and processing the characters to an easily recognizable image has been used.

However, it may be difficult to improve the character recognition accuracy even by using the conventional image processing technique. In a receipt on which characters have been printed using a receipt printer, for example, there may occur a phenomenon (vertical line missing) that white streaks occur perpendicularly to a paper conveyance direction and the character and an image are chipped. Defective printing by adhesion (fusion) of a foreign substance to a printing section of the receipt printer is a main cause of the vertical line missing. In the general receipt printer, when heat generated in the printing section is transmitted to thermal paper (receipt paper), characters are drawn. However, mixing of the foreign substance may inhibit thermal conduction to the thermal paper. Accordingly, the characters cannot be drawn on the thermal paper just below the foreign substance, and defective printing due to vertical line missing occurs. It is very difficult to recognize the character that has been chipped due to the vertical line missing. Accordingly, to recognize the chipped character, the chipped character needs to be corrected.

Japanese Patent Application Laid-Open No. 2010-114567 describes a method of performing correction based on information about pixels adjacent to a vertical line missing region. For example, some of chipped characters can be corrected by changing the inside of the region into black pixels if pixels adjacent to and on both sides of the vertical line missing region are black pixels, and not changing the inside of the region if the pixels adjacent to and on both sides of the vertical line missing region are white pixels.

However, although correction is performed assuming that the width of the vertical line missing region is a constant value according to the method disclosed in Japanese Patent Application Laid-Open No. 2010-114567, an actual width of the vertical line missing region may vary by approximately several pixels depending on a position. Accordingly, the chipped characters may not be sufficiently corrected because pressure and a contact area of a printing section are unstable due to mixing of a foreign substance into the printing section so that thermal conduction to thermal paper varies. The thermal conduction to the thermal paper varies by approximately several ten microns to several hundred microns (corresponding to two to three pixels in a scan image of 300 dpi).

Japanese Patent Application Laid-Open No. H01-266682 describes a method of correcting a chipped character by performing morphology expansion processing and contraction processing in combination a plurality of times for a binarized scan image.

However, in the method disclosed in Japanese Patent Application Laid-Open No. H01-266682, a character, which is high in black pixel density, such as a kanji character is underexposed, and pixel groups more narrowly spaced than the width of a vertical line missing region connect with each other. Accordingly, respective recognition accuracies of other characters and character strings may be deteriorated.

SUMMARY

The present disclosure is directed to an image processing apparatus that is characterized by comprising: a memory; and a processor configured to: acquire a first binary image; execute a first morphology for the first binary image, to generate a second binary image; specify at least one vertical line missing region based on the second binary image; execute a second morphology under a condition different from a condition in the first morphology for the second binary image, to generate a third binary image; acquire pixel information about a region corresponding to the at least one vertical line missing region in the third binary image; and correct a region corresponding to the at least one vertical line missing region in the first binary image using the acquired pixel information, to generate a fourth binary image.

Further features of the present disclosure will become apparent from the following description of exemplary embodiments with reference to the attached drawings.

DESCRIPTION OF THE EMBODIMENTS

Preferred embodiments of the present disclosure will now be described in detail in accordance with the accompanying drawings. The embodiments described below are illustrative of the present disclosure, and the scope of the present disclosure is not intended to be limited to those. Not all of combinations of features described in the following embodiments are essential as a solution of the present disclosure.

First Embodiment

Figure 1:
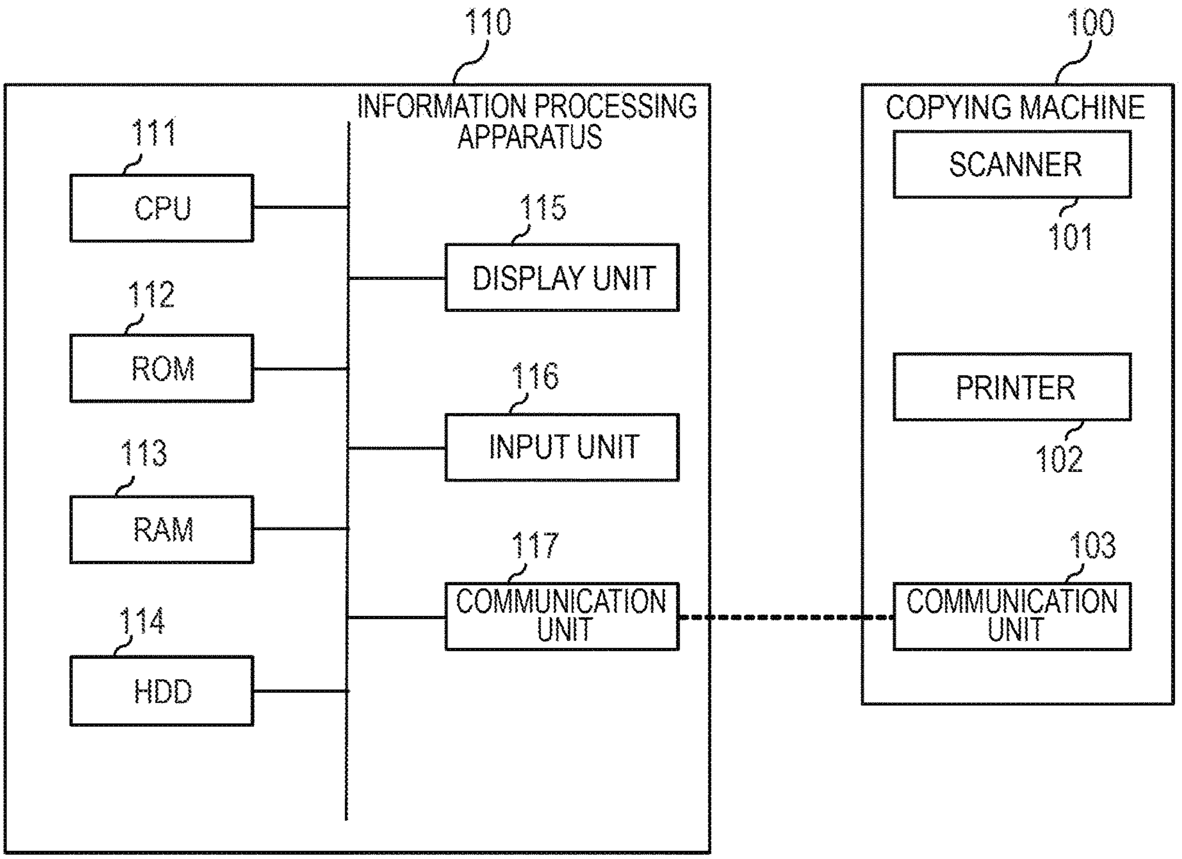
FIG. 1 is a diagram illustrating an information processing system according to an embodiment.

FIG. 1 is a diagram illustrating an information processing system according to an embodiment of the present disclosure.

The information processing system includes a copying machine 100 and an information processing apparatus 110.

The copying machine 100 includes a scanner 101, a printer 102, and a communication unit 103 on the copying machine side. The scanner 101 scans a document, to generate a scan image. The printer 102 forms an image. The communication unit 103 on the copying machine side communicates with an external apparatus via a network.

The information processing apparatus 110 includes a CPU 111, a ROM 112, a RAM 113, an HDD 114, a display unit 115, an input unit 116, and a communication unit 117 on the information processing apparatus side. The CPU 111 reads out a control program stored in the ROM 112, and performs various types of processing. The RAM 113 is used as a temporary storage region such as a main memory or a work area in the CPU 111. The HDD 114 stores various types of data, various types of programs, and the like. A function and processing of the information processing apparatus 110, described below, are implemented when the CPU 111 reads out a program stored in the ROM 112 or the HDD 114 and executes the program.

The communication unit 117 on the information processing apparatus side performs processing for communicating with the external apparatus via a network. The display unit 115 displays various types of information. The input unit 116 includes a keyboard and a mouse, and accepts various types of operations by a user. The display unit 115 and the input unit 116 may be integrally provided, like a touch panel. The display unit 115 may perform projection by a projector, and the input unit 116 may recognize a position of a fingertip corresponding to a projected image with a camera.

In the present embodiment, the scanner 101 in the copying machine 100 scans a document such as a receipt, to generate a scanned original image (scan image). The scan image is transmitted to the information processing apparatus 110 by the communication unit 103 on the copying machine side. In the information processing apparatus 110, the communication unit 117 on the information processing apparatus side receives the scan image, and stores the received scan image in a storage unit such as an HDD 114. In the present embodiment, a vertical line missing region means a region on which printing has not been performed due to defective printing of a printer.

Figure 2:
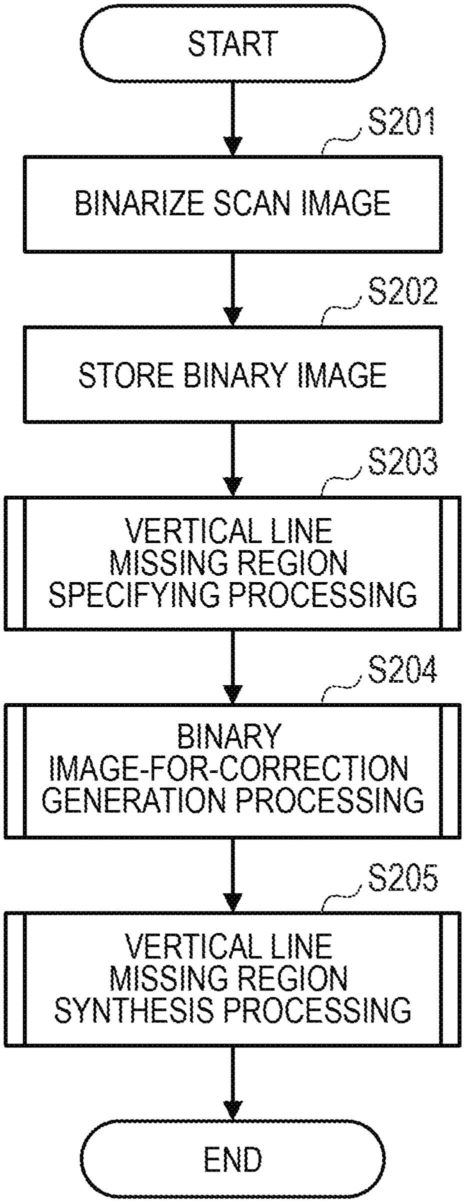
FIG. 2 is a flowchart illustrating vertical line missing image correction processing according to a first embodiment.

FIG. 2 is a flowchart illustrating vertical line missing image correction processing according to the first embodiment. In S201, the CPU 111 binarizes a scan image scanned by the scanner 101 in the copying machine 100 and stored in the HDD 114 by the CPU 111, to generate a binary image A (binarization processing). The binarization processing means processing for converting an image into a black-and-white gray scale image. That is, a pixel in a darker color than a threshold color is a black pixel, and a pixel in a lighter color than the threshold color is a white pixel. In the present embodiment, as a method of generating a binary image, a method of determining the threshold color from a histogram of an entire scan image is used. If an image is converted into a black-and-white binary image with an accuracy enabling subsequent character recognition, a specific method for binarization processing does not matter.

Then, in step S202, the CPU 111 corrects an inclination of the binary image A, to generate a binary image B after the inclination correction (inclination correction processing). To accurately detect a vertical line missing region, an image having no inclination is required. However, an image may be actually inclined at a few degrees at the time of scanning. Accordingly, processing for correcting the inclination of the image needs to be performed. In the present embodiment, respective positions of characters are specified from the binary image A, and an inclination is detected and corrected based on a positional relationship among the characters, to generate the binary image B after the inclination correction. If the inclination correction can be correctly performed, a method of inclination correction processing does not matter. The CPU 111 stores the binary image B after the inclination correction in the RAM 113.

Figure 3A:
FIGS. 3A, 3B, and 3C illustrate an example of a binary image after inclination correction to be generated in the first embodiment.
Figure 3B:
Figure 3C:
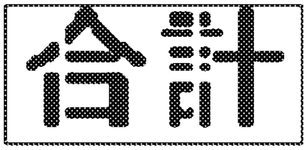

FIG. 3A illustrates an example of the binary image B to be generated in the present embodiment. FIGS. 3B and 3C respectively illustrate images obtained by enlarging characters “ﾏｲｼｮｯﾌﾟ” and characters “合計” in the binary image B.

As illustrated in FIG. 3B, it is found that character chipping has occurred in a character “ﾌﾟ”. As illustrated in FIG. 3C, it is found that character chipping has also occurred in characters “合” and “計”. Further, as illustrated in FIG. 3A, it is found that similar character chipping (vertical line missing) has occurred in the same column in a vertical direction in a scan image 301. Thus, positions where vertical line missing occurs (vertical line missing regions) occur in the same column, although indefinite.

Figure 4:
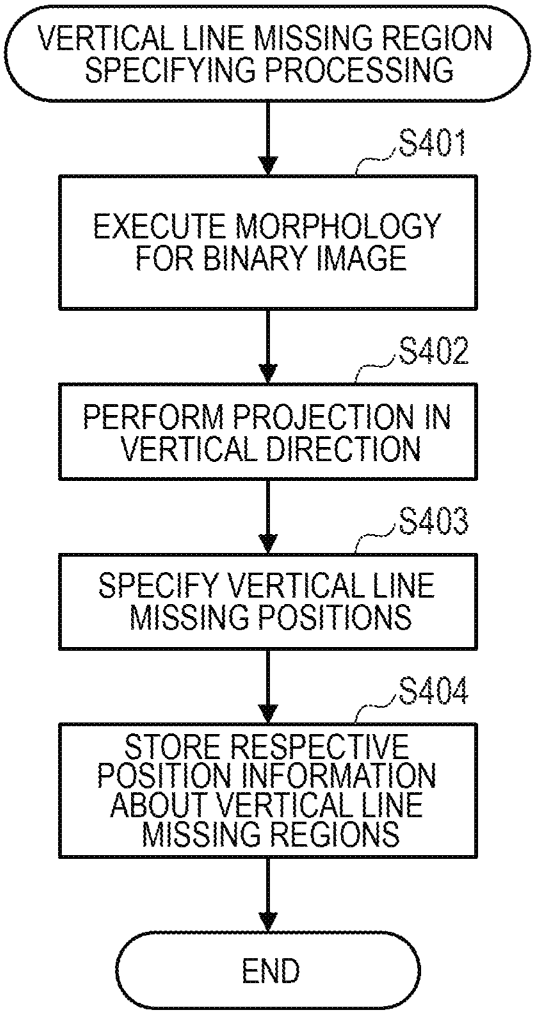
FIG. 4 is a flowchart illustrating vertical line missing region specifying processing according to the first embodiment.

Then, in S203, the CPU 111 specifies a vertical line missing region from the binary image B (vertical line missing region specifying processing). FIG. 4 is a flowchart illustrating details of the vertical line missing region specifying processing to be performed in S203.

In S401, the CPU 111 performs first morphology processing for the binary image B, to generate a vertical line missing region specifying image C.

The CPU 111 stores the vertical line missing region specifying image C in the RAM 113. A region of the RAM 113 storing the vertical line missing region specifying image C differs from a region of the RAM 113 storing the binary image B.

In the present embodiment, as the first morphology processing, white pixel expansion processing (expansion processing for enlarging a white pixel region) by morphology processing is performed to acquire the vertical line missing region to have a relatively large width in consideration of a variation in width of the vertical line missing region, as described above. For example, when processing for detecting a white pixel within the binary image B to respectively set eight pixels around the white pixel as white pixels is performed, the white pixel region can be expanded. How many white pixels are to be expanded (or how many times expansion is to be performed) is arbitrary. However, the number of times of expansion is desirably set such that a stroke of a character does not completely disappear. Even if a position of the vertical line missing region has shifted between an upper part and a lower part of a document due to an effect of noise or the like, the vertical line missing region is enlarged by the first morphology processing. Thus, the vertical line missing region is easily specified. As the first morphology processing, another image processing may be used in combination to also simultaneously perform isolated point noise removal. For example, white pixel contraction processing is further performed after white pixel expansion processing has been performed several times. For example, when white pixel expansion processing is performed two times, noise of a small black pixel group is deleted. However, a line width of the stroke of the character is thinned. Thus, a line width of the character can be then thickened by performing white pixel contraction processing (i.e., black pixel expansion processing).

Figure 5A:
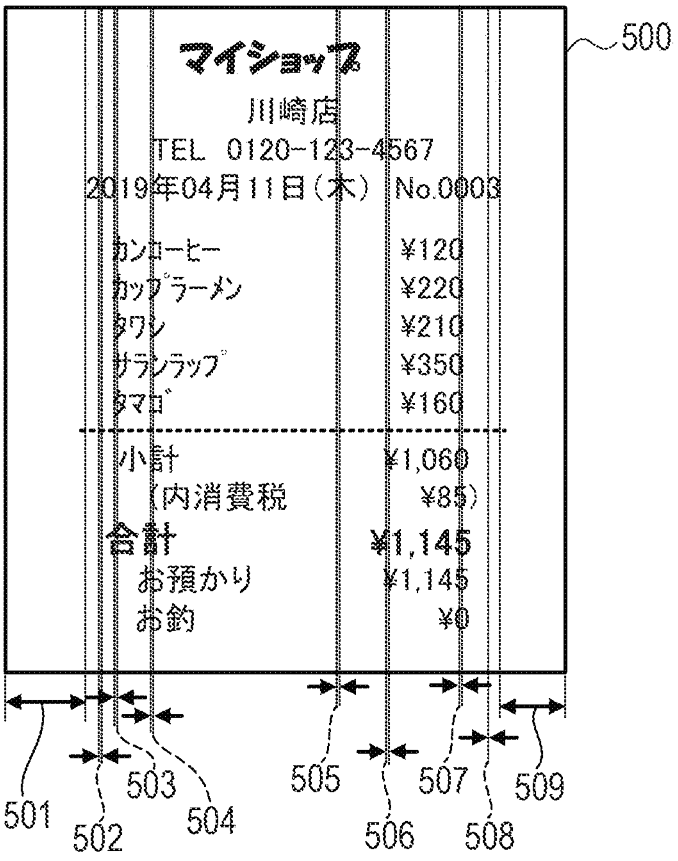
FIGS. 5A and 5B illustrate an example of a vertical line missing region specifying image to be generated in the first embodiment.

FIG. 5A illustrate an example of the vertical line missing region specifying image C to be generated by the first morphology processing. Pixels at positions of vertical line missing regions 501 to 509 are respectively white pixels.

Figure 5B:
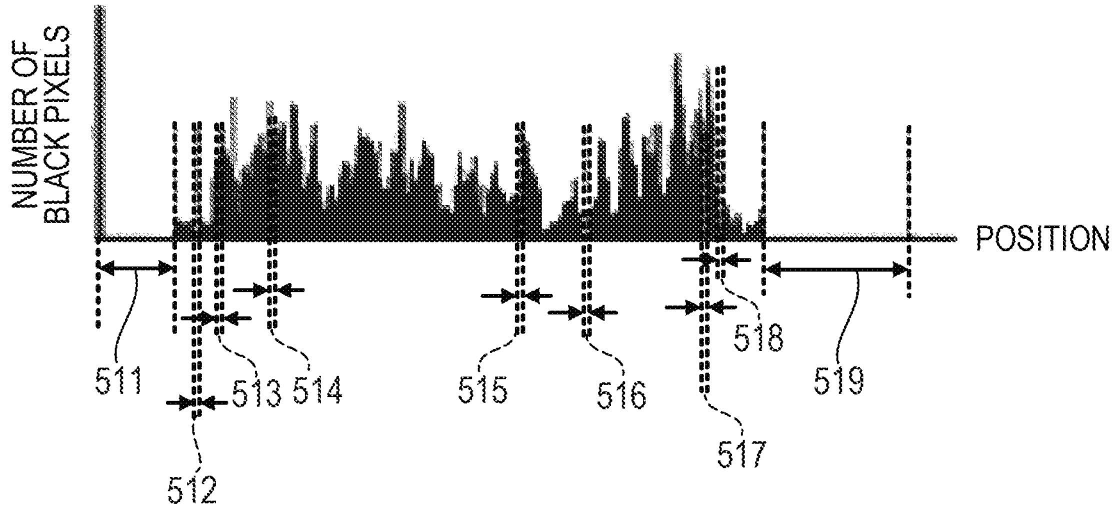

In S402, the CPU 111 performs projection (i.e., counting of the number of black pixels) in the vertical direction for the vertical line missing region specifying image C, to generate a projection histogram D. FIG. 5B illustrates an example of the projection histogram D.

In S403, the CPU 111 specifies vertical line missing positions 511 to 519 based on a position to be a region where the number of black pixels in the projection histogram D is a threshold value or less. Respective position information (X) about the vertical line missing regions 501 to 509 in the vertical line missing region specifying image C respectively corresponding to the vertical line missing positions 511 to 519 in the projection histogram D are acquired. In the present embodiment, a threshold value of the number of black pixels for specifying a vertical line missing position of the projection histogram D is set to zero. If the vertical line missing region can be specified, another threshold value may be used.

Then, in S404, the CPU 111 stores the respective position information X about the vertical line missing regions 501 to 509 in the RAM 113. The regions 501 and 509 may be excluded from the vertical line missing regions by being determined as margin regions because they are regions existing at both left and right ends of an image, although also respectively handled as vertical line missing regions in the present embodiment.

Figure 6:
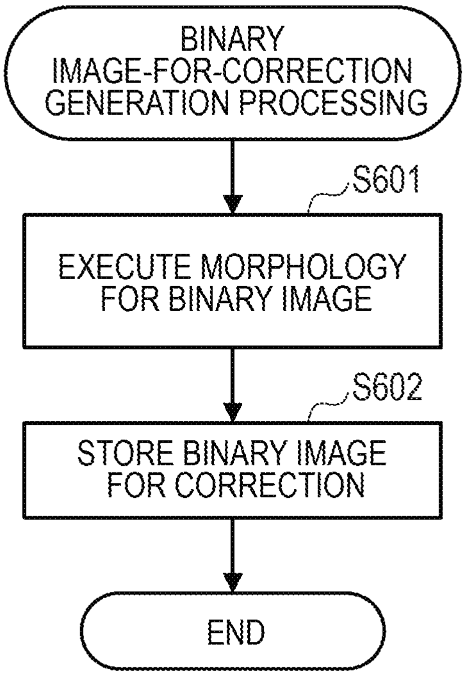
FIG. 6 is a flowchart illustrating secondary image-for-correction generation processing according to the first embodiment.

Then referring to the flowchart of FIG. 2 again, in S204, the CPU 111 generates a binary image for correction E (binary image-for-correction generation processing) using the binary image B. FIG. 6 is a flowchart illustrating details of the binary image-for-correction generation processing to be performed in S204.

In S601, the CPU 111 performs second morphology processing under a condition different from a condition in the first morphology processing performed in S401 for the binary image B, to generate the binary image for correction E.

In the present embodiment, as the second morphology processing, white pixel contraction processing (processing for enlarging a black pixel region) by morphology processing is performed to fill character chipped portions included in regions of the binary image B respectively corresponding to the vertical line missing regions 501 to 509. If the respective character chipped portions in the vertical line missing regions can be filled, expansion processing and contraction processing by morphology may be combined with each other or another image processing may be together used as the second morphology processing.

Figure 7A:
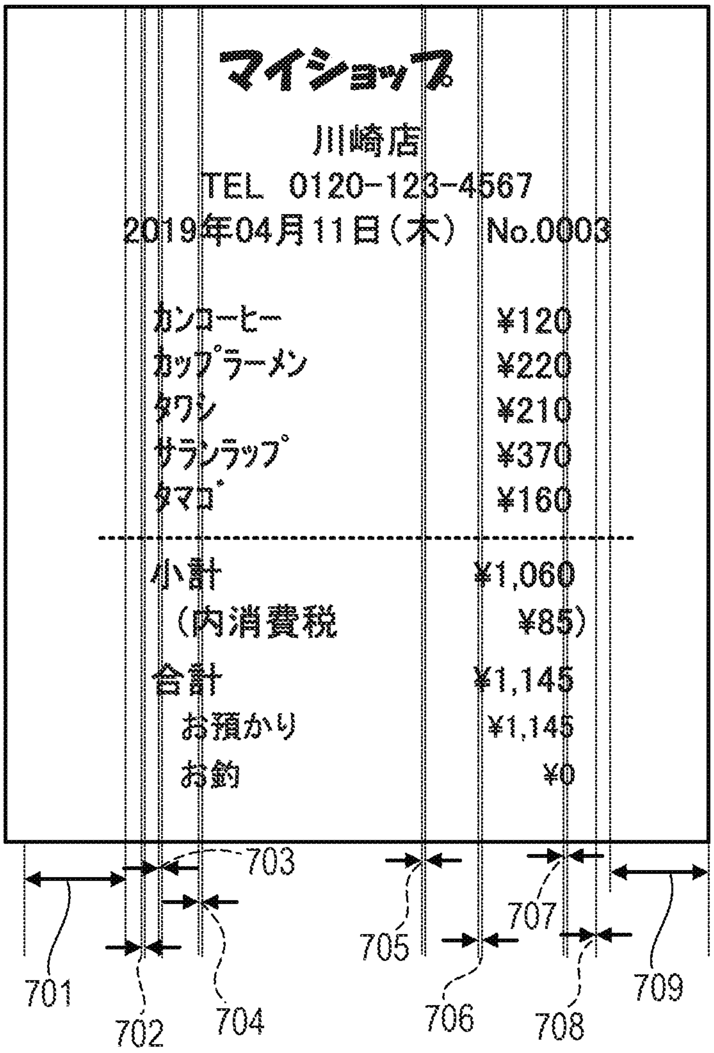
FIGS. 7A, 7B, and 7C illustrate an example of a binary image for correction to be generated in the first embodiment.

FIG. 7A illustrates an example of the binary image for correction E generated by performing the second morphology processing for the binary image B. Although chipped character portions are filled in regions 701 to 709 at positions respectively corresponding to the vertical line missing regions 501 to 509 in the binary image for correction E, the second morphology processing is simultaneously performed for the entire binary image B. Thus, a defective image can also be generated by white pixel contraction processing in an area other than the vertical line missing regions.

Figure 7B:
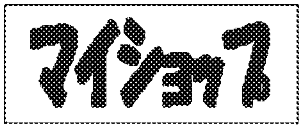
Figure 7C:
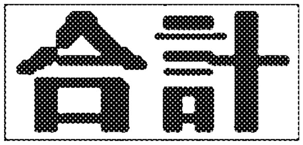

FIGS. 7B and 7C each illustrate an image obtained by enlarging a part of the binary image for correction E. For example, there is also an area where a character chipped portion in the vertical line missing region as seen in FIG. 3B is filled and corrected to connect with the other portion, like in a character "プ" illustrated in FIG. 7B. Although a character chipped portion in the vertical line missing region is also corrected in FIG. 7C, black pixels in an area not to originally connect with each other may connect with each other simultaneously with the correction. For example, "言" and "十" have connected with each other, like in a character "計" illustrated in FIG. 7C. That is, black pixels in an area not to originally connect with each other have connected with each other by white pixel contraction processing (black pixel expansion processing) so that defective pixels have been generated. When the defective pixels are thus generated, a character recognition accuracy deteriorates. Accordingly, a character in the vertical line missing region needs to be corrected without generating a defective image.

Then, in S602, the CPU 111 stores in the RAM 113 the binary image for correction E generated in S601. A region of the RAM 113 storing the binary image for correction E differs from a region of the RAM 113 storing the binary image B or the like.

Then referring to the flowchart of FIG. 2 again, in S205, the CPU 111 synthesizes respective pixel information Y about the regions 701 to 709 at the positions corresponding to the vertical line missing regions 501 to 509 in the binary image for correction E with the binary image B. As a result, character chipping in the binary image B is corrected (vertical line missing region synthesis processing).

Figure 8:
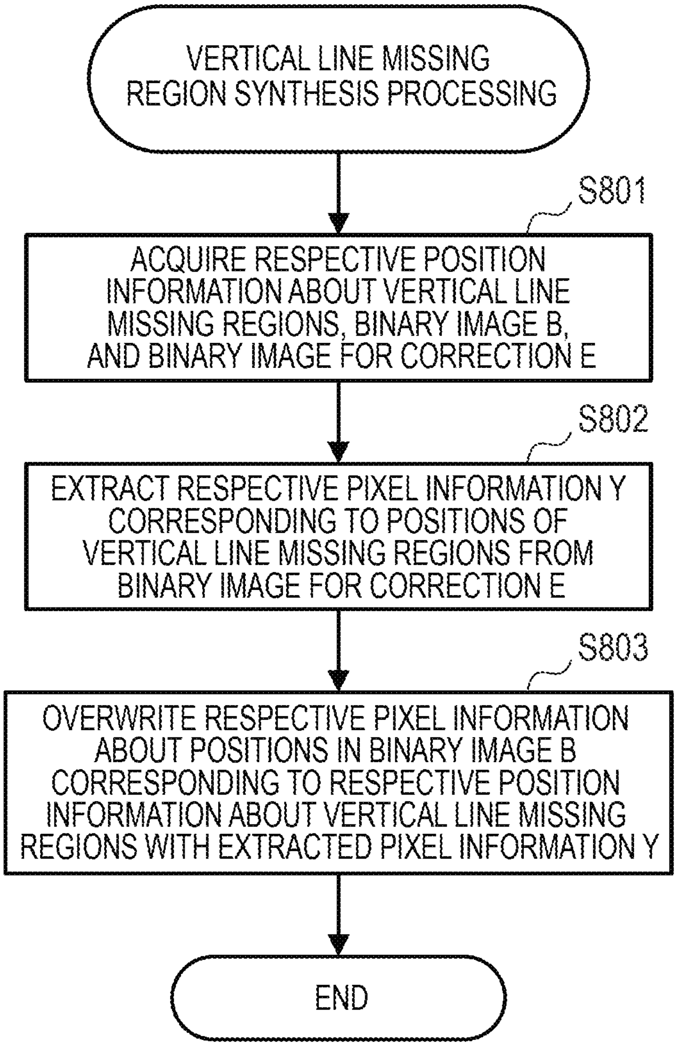
FIG. 8 is a flowchart illustrating vertical line missing region synthesis processing according to the first embodiment.

FIG. 8 is a flowchart illustrating details of the vertical line missing region synthesis processing to be performed in S205. In S801, the CPU 111 acquires data of the respective position information X about the vertical line missing regions 501 to 509 stored in the RAM 113, the binary image B, and the binary image for correction E, and stores the acquired data in a register.

Then, in S802, the CPU 111 extracts the respective pixel information Y about the regions 701 to 709 at positions corresponding to the respective position information X about the vertical line missing regions 501 to 509 from the binary image for correction E using the above-described data.

Then, in S803, the CPU 111 overwrites respective pixel information about positions within the binary image B corresponding to the respective position information X about the vertical line missing regions 501 to 509 with the respective pixel information Y about the regions 701 to 709 extracted from the binary image for correction E, to generate a composite binary image F. In generating the composite binary image F, not only overwriting processing of pixel values but also processing such as a bit operation and synthesis may be used.

Figure 9A:
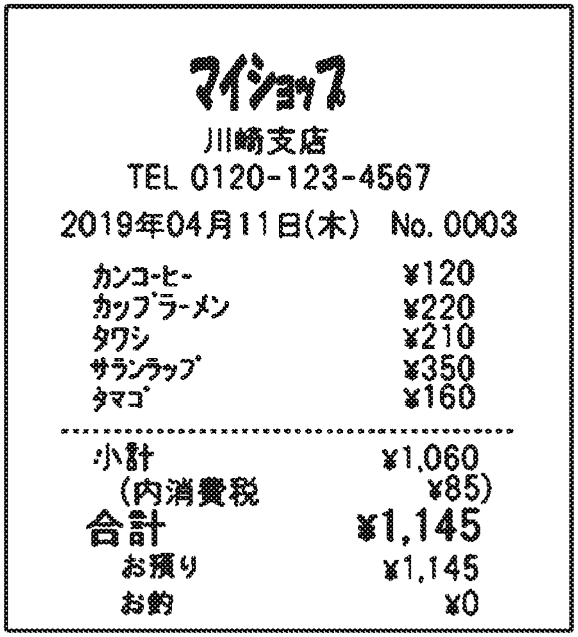
FIGS. 9A, 9B, and 9C illustrate an example of a composite binary image to be generated in the first embodiment.
Figure 9B:
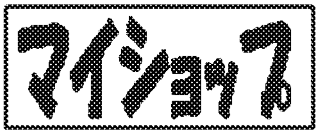
Figure 9C:
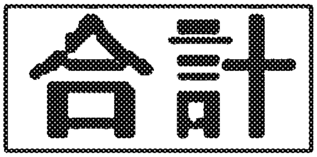

FIG. 9A illustrates an example of the composite binary image F overwritten with the respective pixel information Y about the vertical line filled regions 701 to 709. FIGS. 9B and 9C each illustrate an image obtained by enlarging a part of the composite binary image F.

In FIGS. 9B and 9C, it is found that vertical line missing existing in the binary image B as seen in FIGS. 3B and 3C has been corrected. In FIG. 9C, it is also found that connection and underexposure of a character as seen in FIG. 7C have not occurred.

As described above, according to the present embodiment, the character chipped by vertical line missing can be corrected, and a region other than a vertical line missing region can be prevented from being overexposed.

Second Embodiment

Although the width of the vertical line missing region is not constant but differs depending on a position, as described above, a significantly wide region may be missing depending on a scan image. Therefore, if a region where the width of the vertical line missing region is significantly large exists in the scan image, character chipping in the region may not be sufficiently corrected in the method according to the first embodiment.

In the present embodiment, when a maximum width of the respective widths of vertical line missing regions is calculated and a condition of second morphology processing is determined such that sufficient correction can also be performed in the maximum width, sufficient correction is implemented in all vertical line missing regions.

A difference from the first embodiment will be mainly described below. A configuration and processing for a portion not to be particularly described are the same as those in the first embodiment.

Figure 10:
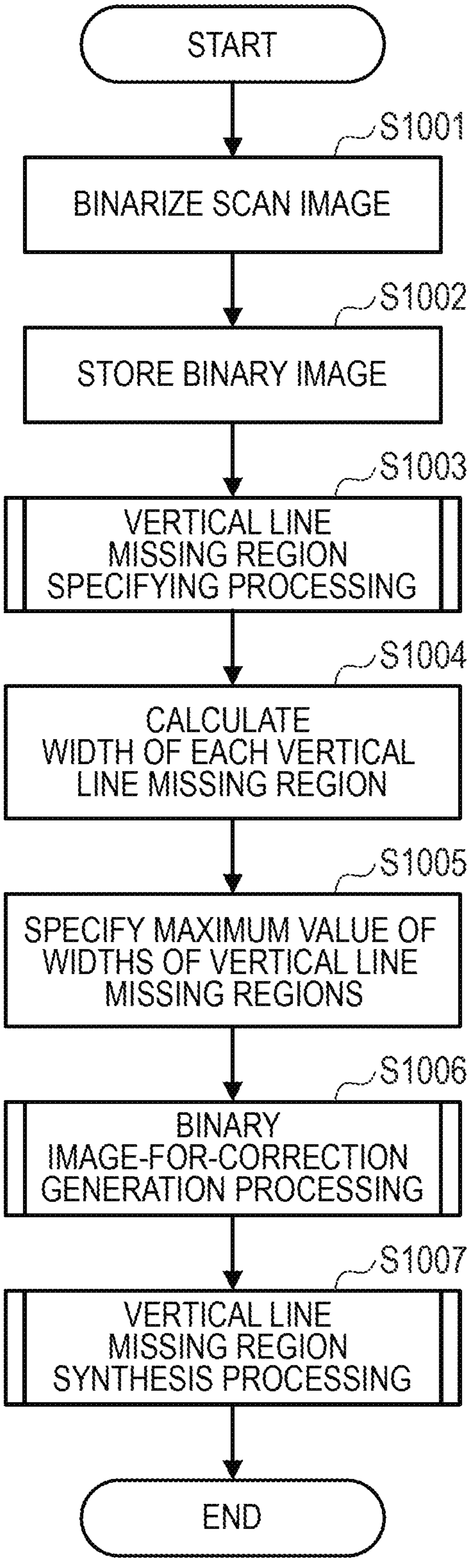
FIG. 10 is a flowchart illustrating vertical line missing image correction processing according to a second embodiment.

FIG. 10 is a flowchart illustrating vertical line missing image correction processing according to a second embodiment.

Processes in S1001 to S1003 are similar to processes in S201 to S203 in the first embodiment illustrated in the flowchart of FIG. 2.

In the present embodiment, in S1004, the CPU 111 calculates the width of each of the vertical line missing regions specified in S1003.

Then, in S1005, the CPU 111 specifies a maximum value of the respective widths of the vertical line missing regions calculated in S1004, and stores the specified maximum value in a register. In the example illustrated in FIG. 5A, regions 501 and 509 are regions respectively existing at both left and right ends of an image, and therefore are excluded from the vertical line missing regions by being respectively determined as margins. That is, a maximum width is specified from among the respective widths of the regions 502 to 508.

Then, in S1006, the CPU 111 performs image-for-correction generation processing.

In the image-for-correction generation processing according to the present embodiment, contraction processing (processing for enlarging a black pixel region) by morphology is performed as second morphology processing to fill a vertical line missing region, like in the first embodiment. The contraction processing by morphology to be performed in the present embodiment is performed on condition that sufficient correction can also be performed in the maximum width of the respective widths of the vertical line missing regions specified in S1005.

When an appropriate morphology condition is determined for each of the vertical line missing regions based on the width of the vertical line missing region, to generate each corrected image, the vertical line missing regions can also be corrected more accurately.

As described above, according to the present embodiment, even if a vertical line missing region having a significantly large width exists in a scan image, the vertical line missing region can be accurately corrected.

Third Embodiment

Although the above-described embodiment has assumed the scan image having a relatively large number of characters existing therein, the number of characters within the scan image may be significantly small depending on the type of the scan image. In the scan image having a small number of characters, particularly if the number of characters is small in a vertical direction, a white pixel region between the characters may be recognized as a vertical line missing region.

Thus, for the scan image having a small number of characters, correction processing may also be usually performed by recognizing a space between the characters as a vertical line missing region. However, if the space between the characters is significantly narrow, the respective characters on both sides of the vertical line missing region may connect with each other.

Figure 13A:
FIGS. 13A, 13B, and 13C illustrate an example of a binary image after inclination correction to be generated in the third embodiment.

FIG. 13A illustrates an example of a binary image B after inclination correction used in the present embodiment.

Figure 13B:
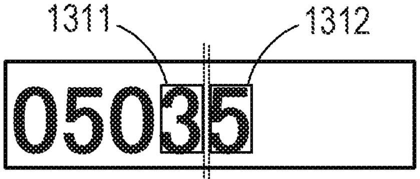
Figure 13C:
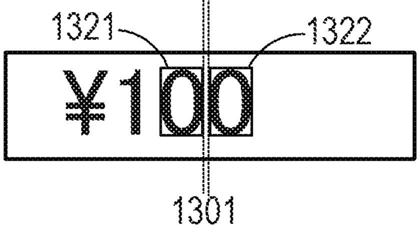

FIGS. 13B and 13C each illustrate a part of FIG. 13A in an enlarged manner. Since no character exists throughout in a vertical direction in a region 1301 between "3" and "5" illustrated in FIG. 13B and between "0" and "0" illustrated in FIG. 13C, the region 1301 is erroneously recognized as a vertical line missing region. A spacing of the vertical line missing regions 1301 erroneously recognized is narrow. Accordingly, when the correction processing according to the first and second embodiments is performed, two characters "3" and "5" and two characters "0" and "0" may respectively connect with each other.

In the present embodiment, pixel groups on both sides adjacent to a region determined to be a vertical line missing region are individually evaluated, to determine whether each of the pixel groups can be recognized as a character. If the pixel groups on both sides can be respectively recognized as characters, the pixel groups on both sides can be respectively determined to be different characters. That is, the vertical line missing region is a normal region between the characters, and it is determined that the vertical line missing region need not be subjected to correction processing. Accordingly, the characters on both sides of the vertical line missing region are prevented from being erroneously connected to each other by the correction processing. The character means an element representing an item such as a date, a company name, an amount of money, a telephone number, or the like drawn on a document such as a business form, and includes a numeral, a symbol, or the like.

A difference from the first embodiment will be mainly described below. A configuration and processing for a portion not to be particularly described are similar to those in the first embodiment.

Figure 11:
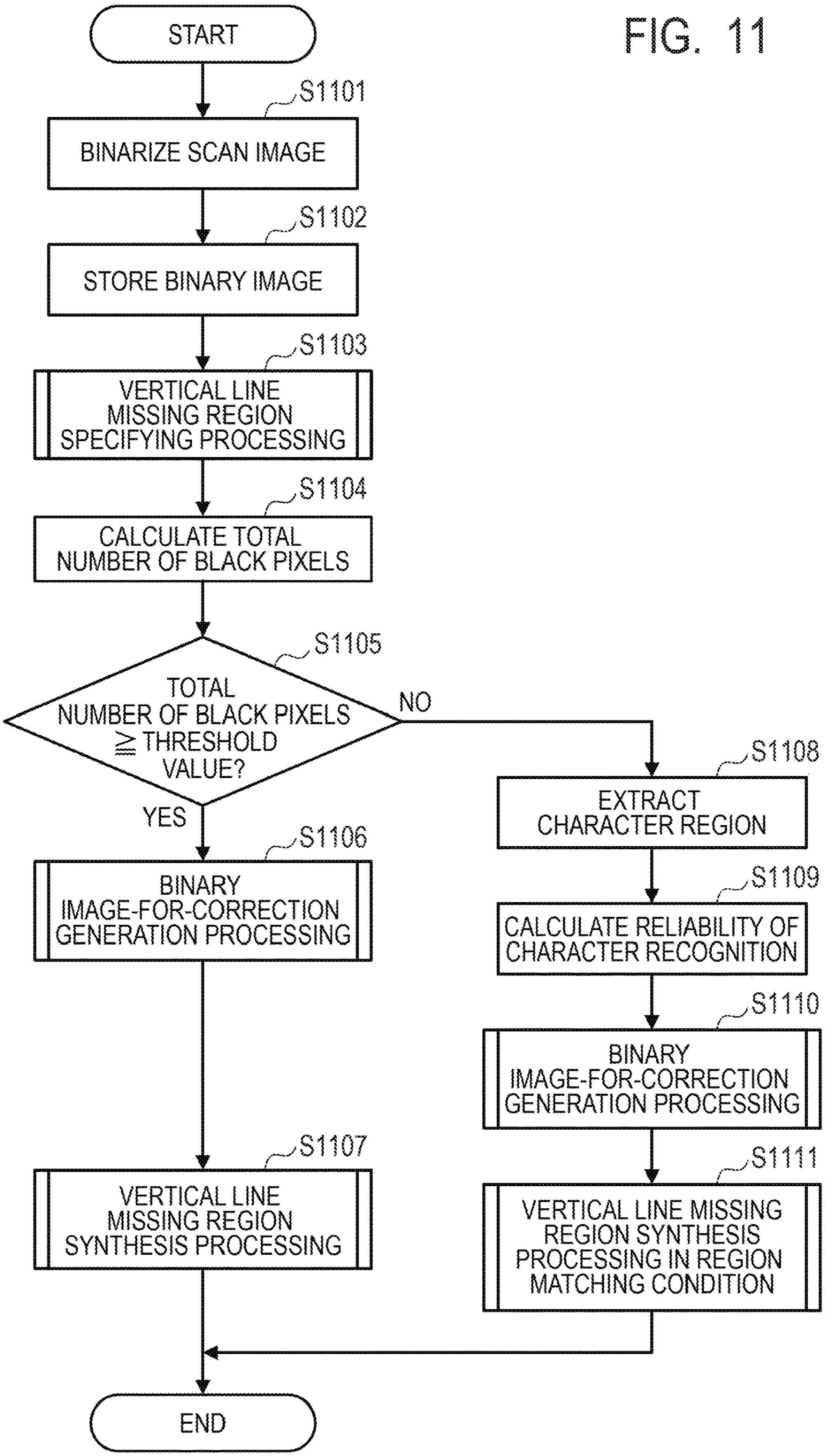
FIG. 11 is a flowchart illustrating vertical line missing image correction processing according to a third embodiment.

FIG. 11 is a flowchart illustrating vertical line missing image correction processing according to the present embodiment.

Processes in S1101 to S1103 are similar to the processes in S201 to S203 in the first embodiment illustrated in FIG. 2.

When the vertical line missing region specifying processing is performed in S1103, the CPU 111 calculates character information as information related to the number of characters within a scan image from a binary image B in S1104. The character information means information as determination criteria for determining whether the number of characters within the scan image is significantly small, and examples of the character information include a total number of black pixels, a total number of characters, a total number of rows, and a character spacing within the binary image. In the present embodiment, it is determined whether the number of characters is significantly small depending on whether the calculated total number of black pixels is smaller than a predetermined threshold value. If it can be determined whether the number of characters within the scan image is significantly small, the character information listed above as examples, excluding the total number of black pixels, may be used as determination criteria, or the determination criteria may be used in combination.

Then, in S1105, the CPU 111 determines whether information related to the number of characters within the scan image satisfies a predetermined condition (whether the total number of black pixels is a predetermined threshold value or more in the present embodiment). If the total number of black pixels is the threshold value or more, i.e., a sufficient number of characters exist within the binary image B (Yes in S1105), the processing proceeds to S1106. In S1106, similar processing to the processing in the first embodiment is performed. If the total number of black pixels is smaller than the threshold value (No in S1105), the processing proceeds to S1108.

In S1108, the CPU 111 extracts character regions from the binary image B, and stores the extracted character regions in the RAM 113.

Then, in S1109, the CPU 111 performs character recognition processing for each of the extracted character regions, to calculate a reliability. The reliability in the present embodiment means a representation by a numerical value (0 to 255) of a degree of matching between a feature amount of a character to be subjected to character recognition processing and a feature amount of a character as an OCR result. The lower the numerical value is, the more reliable a result of the character recognition processing can be. If respective likelihoods of results of the character recognition processing for the characters can be objectively compared with one another, a method of representing the reliability does not matter.

In S1110, the CPU 111 generates a binary image for correction E by correcting the vertical line missing region using the binary image B (image-for-correction generation processing). The processing is similar to a process in S204 in the first embodiment illustrated in FIG. 2.

In S1111, the CPU 111 extracts pixel information Y about a region at a position corresponding to the vertical line missing region in the binary image for correction E, and synthesizes the extracted pixel information with the binary image B (vertical line missing region synthesis processing). If it is determined that pixel groups on both sides adjacent to the vertical line missing region are respectively individual characters, the vertical line missing region is excluded from the synthesis processing.

Figure 12:
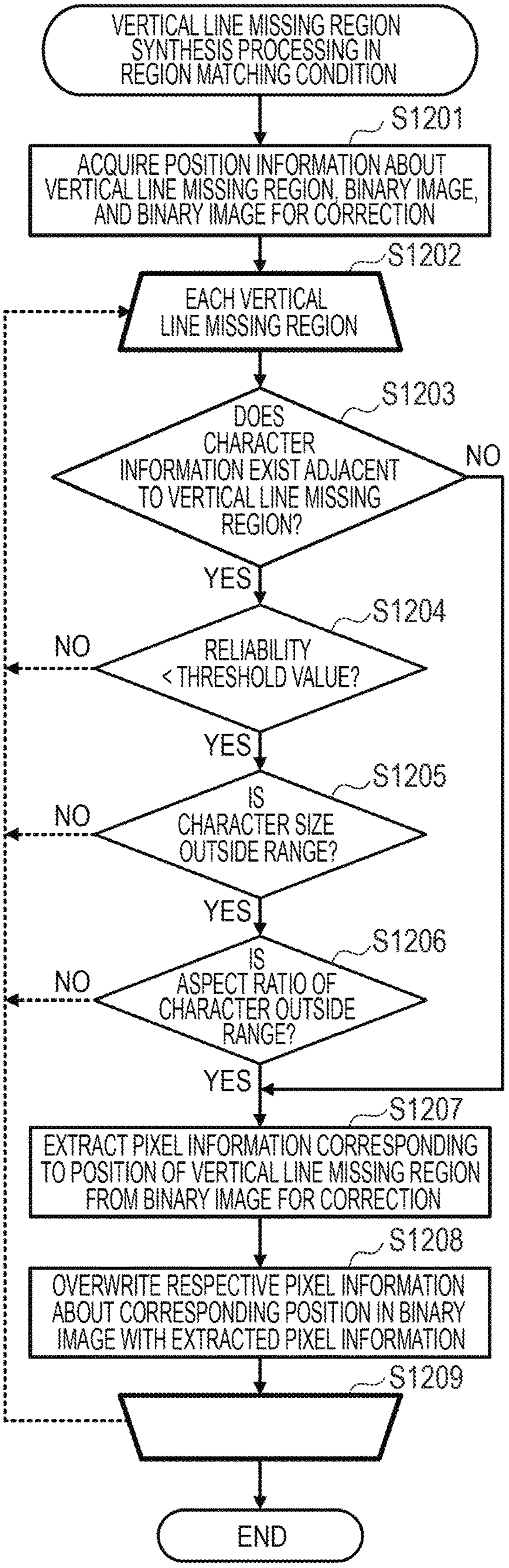
FIG. 12 is a flowchart illustrating vertical line missing region synthesis processing according to the third embodiment.

FIG. 12 is a flowchart illustrating details of the vertical line missing region synthesis processing to be performed in S1111.

In S1201, the CPU 111 acquires data of position information X about a vertical line missing region stored in the RAM 113, a binary image B, and a binary image for correction E and stores the acquired data in a register. The processing is similar to a process in S801 in the first embodiment illustrated in FIG. 8.

Then, in a loop from S1202 to S1209, the CPU 111 overwrites each of vertical line missing regions when the vertical line missing region matches a predetermined condition. It is determined whether each of the vertical line missing regions matches the predetermined condition based on each of items in S1203 to S1206.

If it is determined that each of the vertical line missing regions is overwritten, the CPU 111 extracts pixel information Y about a position corresponding to the vertical line missing region in the binary image for correction E, and synthesizes the extracted pixel information Y with the binary image B by overwriting a corresponding position of the binary image B in S1207 and S1208. Processes in S1207 and S1208 are similar to processes in S802 and S803 in the first embodiment illustrated in FIG. 8.

First, in S1203, the CPU 111 determines whether pixel groups on both sides adjacent to the vertical line missing region may be respectively single characters. The character includes a numeral, a symbol, or the like in addition to a general character. If it is determined that the pixel groups are respectively characters (Yes in S1203), the processing proceeds to S1204. If it is determined that the pixel groups are not respectively characters (No in S1203), the processing proceeds to S1207.

In a binary image B illustrated in FIG. 13A, for example, black pixel groups 1311 and 1312 on both sides adjacent to a vertical line missing region 1301 illustrated in FIG. 13B are subjected to character recognition processing. As a character recognition result, characters "3" and "5" are respectively obtained as candidates. As a result of performing character recognition processing for black pixel groups 1321 and 1322 on both sides adjacent to a vertical line missing region 1301 illustrated in FIG. 13C, characters "0" and "0" are respectively obtained as candidates. If candidate characters are obtained as a character recognition result, it is determined that the candidate characters are respectively characters.

Then, the CPU 111 determines whether the characters determined in S1203 may be respectively independent characters based on each of conditions in S1204 to S1206.

First, in S1204, the CPU 111 determines whether a reliability of a character recognition result of the pixel groups on both sides adjacent to the vertical line missing region is lower than a predetermined threshold value.

If the reliability is lower than the threshold value (Yes in S1204), the processing proceeds to S1205. If the reliability is the threshold value or more (No in S1204), each of the pixel groups may be a single character. Thus, the processing returns to S1202. In S1202, overwriting is not performed in the vertical line missing region. Processing is performed for a subsequent vertical line missing region.

In S1205, the CPU 111 evaluates whether the size of each of the black pixel groups adjacent to the vertical line missing region is outside a range of a general character size of a document.

If the size of the black pixel group is outside the range of the general character size (Yes in S1205), the processing proceeds to S1206. If the character size of the black pixel group is within the range of the general character size (No in S1205), the processing returns to S1202. In S1202, overwriting is not performed in the vertical line missing region. Processing is performed for a subsequent vertical line missing region. In the present embodiment, the general character size is evaluated as 20 to 100 pixels. A user may designate a range of the character size.

In S1206, the CPU 111 evaluates whether an aspect ratio of each of characters adjacent to the vertical line missing region is outside a range of a general aspect ratio of the character.

If the aspect ratio of the character is outside the range of the general aspect ratio (Yes in S1206), the processing proceeds to S1207. If the aspect ratio of the character is within the range of the general aspect ratio (No in S1206), the processing returns to S1202. In S1202, overwriting is not performed in the vertical line missing region. Processing is performed for a subsequent vertical line missing region. In the present embodiment, the aspect ratio of the character is defined as a character height/character width, and the range of the general aspect ratio of the character is evaluated as 0.7 to 1.5. The user may specify the range of the aspect ratio of the character.

As described above, according to the present embodiment, even when there are few characters within the scan image and a space between the characters is significantly narrow, the vertical line missing region can be accurately corrected.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-162566, filed Sep. 6, 2019, which is hereby incorporated by reference herein in its entirety.

What is claimed is:

1. An image processing apparatus comprising:
a memory; and
a processor configured to:
acquire a first binary image;
generate a second binary image by executing a first morphology for the first binary image, wherein the first morphology comprises a white pixel expansion processing for enlarging a white pixel region in the first binary image;
specify at least one vertical missing region based on the second binary image;
generate a third binary image by executing a second morphology for the first binary image, wherein the second morphology comprises a white pixel contraction processing for enlarging a black pixel region in the first binary image;
acquire pixel information about a region corresponding to the at least one vertical missing region in the third binary image; and
generate a fourth binary image by correcting a region corresponding to the at least one vertical missing region in the first binary image with the acquired pixel information.

2. The image processing apparatus according to claim 1, wherein the processor generates the fourth binary image by synthesizing the pixel information acquired from the third binary image with the region corresponding to the at least one vertical missing region in the first binary image.

3. The image processing apparatus according to claim 1, wherein the first binary image is a binary image after inclination correction.

4. The image processing apparatus according to claim 1, wherein the at least one vertical missing region is specified based on a position where a number of black pixels is a threshold value or less in a histogram in a vertical direction of the second binary image.

5. The image processing apparatus according to claim 1, wherein a processing content of the second morphology is determined based on a width of the at least one vertical missing region.

6. The image processing apparatus according to claim 5, wherein when a plurality of vertical missing regions are specified, the processing content of the second morphology is determined based on a maximum value of respective widths of the plurality of vertical missing regions.

7. The image processing apparatus according to claim 5, wherein when a plurality of vertical missing regions are specified, the processing content of the second morphology is determined based on the respective widths of the plurality of vertical missing regions.

8. The image processing apparatus according to claim 1, wherein generating the fourth binary image, the processor does not correct for the at least one vertical missing region where black pixel groups adjacent to and on both sides of the vertical missing region are respectively individual characters.

9. The image processing apparatus according to claim 8, wherein when a reliability of a character recognition result of each of the black pixel groups adjacent to and on both sides of the vertical missing region is high, the black pixel groups are determined to be respectively individual characters.

10. The image processing apparatus according to claim 8, wherein in generating the fourth binary image, the processor determines whether to correct for the at least one vertical missing region based on at least one of a reliability of a character recognition result of each of the black pixel groups adjacent to and on both sides of the vertical missing region, a size of each of the black pixel groups, or an aspect ratio of each of the black pixel groups.

11. The image processing apparatus according to claim 1, wherein the first binary image is obtained by binarizing a scan image obtained by scanning a document.

12. An image processing method comprising:

acquiring a first binary image;

generating a second binary image by executing a first morphology for the first binary image, wherein the first morphology comprises a white pixel expansion processing for enlarging a white pixel region in the first binary image;

specifying a vertical missing region based on the second binary image;

generating a third binary image by executing a second morphology for the first binary image, wherein the second morphology comprises a white pixel contraction processing for enlarging a black pixel region in the first binary image;

acquiring pixel information about a region corresponding to the vertical missing region in the third binary image; and generating a fourth binary image by correcting a region corresponding to the vertical missing region in the first binary image with the acquired pixel information.

13. A non-transitory computer readable storage medium storing a program executable by a computer to execute a method comprising:

acquiring a first binary image;

generating a second binary image by executing a first morphology for the first binary image, wherein the first morphology comprises a white pixel expansion processing for enlarging a white pixel region in the first binary image;

specifying a vertical missing region based on the second binary image;

generating a third binary image by executing a second morphology for the first binary image, wherein the second morphology comprises a white pixel contraction processing for enlarging a black pixel region in the first binary image;

acquiring pixel information about a region corresponding to the vertical missing region in the third binary image; and generating a fourth binary image by correcting a region corresponding to the vertical missing region in the first binary image with the acquired pixel information.

* * * * *